April 29, 1958     J. K. SHANNON     2,832,814
STORAGE BATTERY WITH ELECTROLYTE RESERVOIR
Filed Oct. 15, 1953

INVENTOR
JOHN K. SHANNON

BY

*Young Wright*

ATTORNEYS

United States Patent Office 2,832,814
Patented Apr. 29, 1958

2,832,814

STORAGE BATTERY WITH ELECTROLYTE RESERVOIR

John K. Shannon, Kenosha, Wis.

Application October 15, 1953, Serial No. 386,253

5 Claims. (Cl. 136—162)

This invention appertains to storage batteries and more particularly to a novel cover for the cells of storage batteries.

In order to insure maximum long life to the plates of a storage battery, it has been proposed to store storage batteries in a dry state until the batteries are placed in service and at that time to add the required amount of electrolyte to the cells of the battery.

It is, therefore, one of the primary objects of my invention to provide reservoir means incorporated directly with a storage battery for holding a desired amount of acid or electrolyte for each cell of the battery, which can be emptied into the cells of the battery by external means when the battery is put into use.

Another salient object of my invention is to provide a storage battery cover having a reservoir for each battery cell for the electrolyte, with means operable from the outside of the battery for permitting the flow of the electrolyte from the reservoirs into the battery cells.

A further object of my invention is to provide means for establishing an atmospheric vent for the battery cells at the time of the release of the electrolyte into the cells.

A still further object of my invention is to provide means for incorporating a reservoir for electrolyte with the cover of a battery, which can be economically made and which will occupy a minimum amount of space in a storage battery so as to not add to the over-all height of a battery.

Figure 1:
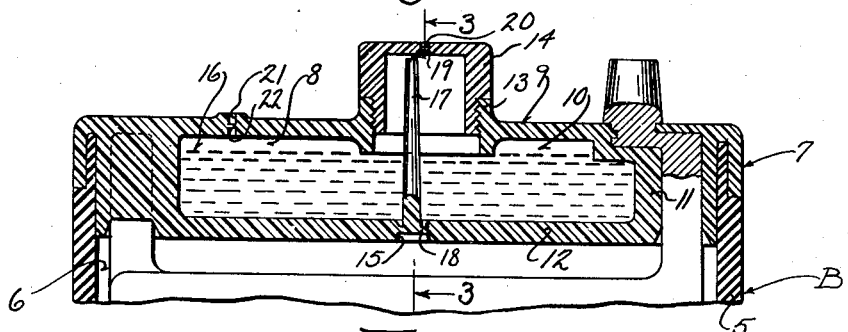
Figure 2:
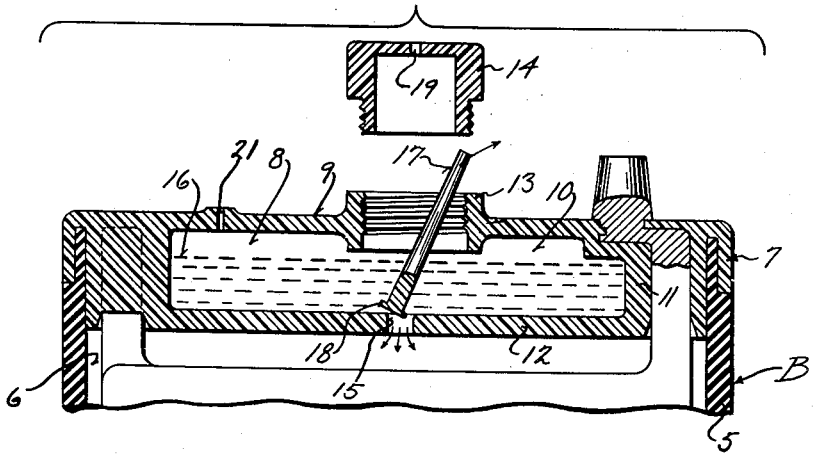
Figure 3:
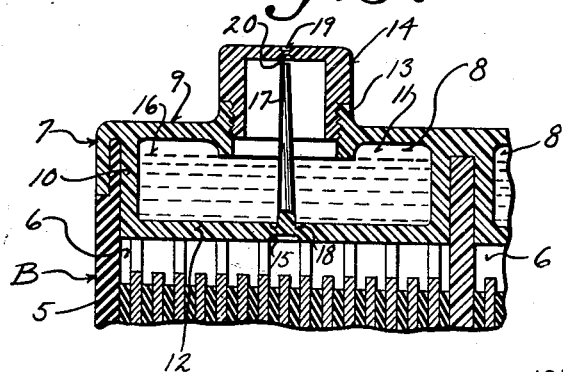

With these and other objects in view, the invention consists in the novel construction, arrangement and formation of parts, as will be hereinafter more specifically described and claimed, and illustrated in the accompanying drawing, in which drawing, Figure 1 is a transverse sectional view through the upper end of a storage battery showing one preferred form of my cover and reservoir incorporated therewith;

Figure 2 is a view similar to Figure 1 and illustrating the means for permitting the flow of the electrolyte from the cover into a battery cell and for establishing the atmospheric vent, and Figure 3 is a fragmentary longitudinal sectional view taken at right angles to Figure 1 and on the line 3—3 of Figure 1, looking in the direction of the arrows.

Referring to the drawing in detail, wherein similar reference characters designate corresponding parts throughout the several views, the letter B generally indicates a storage battery embodying a battery case 5, having a plurality of cells 6 for receiving the groups of positive and negative plates and the separators therefor. The case is closed by a cover 7, and this cover has been shown to be of the unitary type for closing all of the cells 6, but if desired, individual covers can be provided for each cell, as is well known in this art. In fact, the storage battery B, can be considered as of any well known type now on the market and my present invention relates solely to the provision of a reservoir 8 provided for holding a desired quantity of electrolyte for each cell 6. While the reservoir 8 can be incorporated with the cover 7 or with the battery in various manners, I have shown in the drawing and will describe in detail, one preferred embodiment of my invention.

The cover 7 includes an upper plate 9 having connected thereto and depending therefrom, the reservoir 8 for each cell. This reservoir 8 includes side walls 10, end walls 11 and a bottom wall 12. The side and end walls 10 and 11 can form means for intimately engaging the inner faces of the walls and partitions of the battery case 5. If preferred, the top plate 9 of the battery cover can be made separate from the side and end walls of the reservoir and integrally fused therewith by the use of acetate or similar chemical, where the cover is made from thermoplastic material of the Polystyrene type (see my Patent No. 2,618,673, issued November 18, 1952). The cover plate 9 is also provided with the filling necks or bosses 13 for each cell, and these necks are adapted to be closed by removable caps 14 and the filling openings defined by the necks 13 communicate with the reservoirs 8. The lower wall 12 of each reservoir 8 directly below a neck 13 is provided with an outlet opening 15 so that the electrolyte 16 in a reservoir can flow therefrom into a battery cell. When the battery is being maintained in its dry state, the outlet opening 15 is temporarily closed and this can be accomplished in various manners, such as by employing a vertically disposed stem 17, which can be threaded in engagement with the wall of an outlet opening 15. As shown, however, I prefer to have the opening 15 temporarily closed by a weakened, frangible thin wall 18 forming a part of the stem 17. In all instances the stem 17 extends through the neck 13 and into the neck cap 14, so that upon removal of the cap 14 the stem 17 can be firmly grasped by a person to snap the weakened wall 18 from the wall of the opening 15; at which time the stem can be removed through the filling neck and the cap replaced. The contents of the reservoir can then flow into a battery cell.

The cap 14 can be provided with a vent opening 19 and when the battery is being maintained in its dry state, the opening 19 is temporarily closed by a thin wall 20 which can be easily broken through by a punch or nail to establish atmospheric communication between a battery cell through the reservoir and cap. If preferred, a vent opening 21 can be provided at one side of the filling neck and this vent opening is also temporarily closed by a thin wall 22 which also can be easily broken through by a nail or punch.

From the foregoing description, it can be seen that I have provided means for carrying a supply of electrolyte for each cell of a storage battery which is being maintained in a dry state with means actuated from the outside of the battery for releasing the electrolyte stored in the reservoir to the storage battery cells.

In some instances, it might be advisable to have the electrolyte in the reservoir in a concentrated form, and upon release of this concentrated electrolyte into a battery cell to add additional distilled water to the cell.

It is again to be understood that I have shown one embodiment of my invention, and that the main idea of the invention is to provide reservoir means incorporated with a battery, with means which can be actuated externally of the battery for releasing the contents of the reservoir into a battery cell.

Changes in details may be made without departing from the spirit or the scope of this invention, but what I claim as new is:

1. In a storage battery of the type adapted to be maintained in a dry state until placed in service, a case, a cover therefor including a top plate and a reservoir for each cell of the battery carried by said top plate and depending therefrom for extending into the upper end of the battery cells, each reservoir having an opening therein for establishing communication with a cell of a battery, and means operable from the exterior of the battery normally closing said opening.

2. In a storage battery of the type adapted to be maintained in a dry state until placed in service as defined in claim 1 and said cover having a normally closed vent opening for each cell which may be opened when the contents of a reservoir is emptied into a cell, said last named opening having communication with the reservoir.

3. In a storage battery of the type adapted to be maintained in a dry state until placed in service including a case having a plurality of cells and a cover for closing each cell, said cover including a top plate and a depending reservoir for each cell carried by the plate and adapted to extend into the upper end of a cell, said top plate having a filling opening for each cell communicating with each reservoir, each reservoir having directly below the filling opening an outlet opening communicating with a cell, a frangible stem for initially closing said outlet opening extending into the filling opening, and a cap for closing said filling opening.

4. In a storage battery of the type adapted to be maintained in a dry state until placed in service including a case having a plurality of cells and a cover for closing each cell, said cover including a top plate adapted to engage the walls of the case and a depending reservoir for each cell carried by the plate extending into the upper end of a cell, said top plate having a filling opening for each cell communicating with each reservoir, each reservoir having directly below the filling opening an outlet opening communicating with a cell, and means for closing the outlet opening including a stem extending into the filling opening, and a cap for closing said filling opening and normally hiding the stem from view.

5. In a storage battery of the type adapted to be maintained in a dry state until placed in service, a case, a cover for sealing said case and directly engaging said case, a reservoir for electrolyte for each cell of the battery disposed directly within the upper end of the battery between the plates of the battery and the cover, each reservoir having an opening therein for establishing communication with a cell of a battery, and means operable from the exterior of the battery normally closing said opening.

References Cited in the file of this patent
UNITED STATES PATENTS

| | | |
|---|---|---|
| 1,218,847 | Firey | Mar. 13, 1917 |
| 1,301,780 | Lotsch | Apr. 22, 1919 |
| 2,404,144 | Riggs et al. | July 16, 1946 |